United States Patent
Cordeiro et al.

(10) Patent No.: US 9,832,257 B2
(45) Date of Patent: Nov. 28, 2017

(54) SERVICE ACQUISITION TECHNIQUES FOR WIRELESS COMMUNICATIONS SYSTEMS

(71) Applicant: Intel Corporation, Santa Clara, CA (US)

(72) Inventors: Carlos Cordeiro, Portland, OR (US); Emily H. Qi, Portland, OR (US); Bahareh Sadeghi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 109 days.

(21) Appl. No.: 13/965,076

(22) Filed: Aug. 12, 2013

(65) Prior Publication Data

US 2014/0328156 A1 Nov. 6, 2014

Related U.S. Application Data

(60) Provisional application No. 61/818,827, filed on May 2, 2013.

(51) Int. Cl.
*H04L 29/08* (2006.01)
*G06Q 20/32* (2012.01)

(52) U.S. Cl.
CPC .......... *H04L 67/104* (2013.01); *G06Q 20/32* (2013.01); *H04L 67/16* (2013.01)

(58) Field of Classification Search
CPC ... H04L 12/66; H04L 2209/80; H04L 5/0023; H04B 7/0413; H04B 7/0452; H04B 7/0617; H04B 7/0691
See application file for complete search history.

(56) References Cited

U.S. PATENT DOCUMENTS

| | | | |
|---|---|---|---|
| 8,447,829 B1 * | 5/2013 | Geller et al. | 709/217 |
| 2001/0022836 A1 * | 9/2001 | Bremer et al. | 379/88.13 |
| 2002/0147611 A1 * | 10/2002 | Greene et al. | 705/1 |
| 2004/0117460 A1 * | 6/2004 | Walsh et al. | 709/219 |
| 2004/0162027 A1 | 8/2004 | Chang | |
| 2004/0234047 A1 * | 11/2004 | Ciccarelli et al. | 379/88.16 |
| 2005/0152392 A1 | 7/2005 | Lim et al. | |
| 2006/0270387 A1 * | 11/2006 | Hirata | G06Q 10/00 455/411 |
| 2007/0019622 A1 * | 1/2007 | Alt et al. | 370/352 |
| 2007/0218932 A1 * | 9/2007 | Sung | H04W 72/005 455/518 |
| 2007/0275746 A1 | 11/2007 | Bitran | |
| 2008/0086564 A1 * | 4/2008 | Putman et al. | 709/227 |

(Continued)

OTHER PUBLICATIONS

International Search Report and Written Opinion received for PCT Patent Application No. PCT/US2014/036015, dated Nov. 21, 2014, 11 pages.

*Primary Examiner* — Khaled Kassim

(57) ABSTRACT

Improved service acquisition techniques for wireless communications systems are described. In one embodiment, for example, an apparatus may comprise a processor circuit, a service acquisition application for execution by the processor circuit to select multiple services for attempted acquisition, and a service management module for execution by the processor circuit to attempt to acquire the multiple services according to a connection mode, the service management module to attempt to acquire the multiple services concurrently when the connection mode comprises a concurrent connection mode. Other embodiments are described and claimed.

18 Claims, 10 Drawing Sheets

(56) References Cited

U.S. PATENT DOCUMENTS

| | | |
|---|---|---|
| 2009/0016317 A1 | 1/2009 | Wu et al. |
| 2009/0029726 A1* | 1/2009 | Danne ................ H04L 65/1006 |
| | | 455/466 |
| 2009/0077233 A1* | 3/2009 | Kurebayashi et al. ....... 709/224 |
| 2009/0187656 A1* | 7/2009 | Bou-Ghannam . H01L 21/28273 |
| | | 709/224 |
| 2009/0276419 A1* | 11/2009 | Jones et al. ........................ 707/5 |
| 2010/0097981 A1* | 4/2010 | Kant et al. .................... 370/328 |
| 2011/0238840 A1* | 9/2011 | Shi et al. ...................... 709/226 |
| 2011/0243553 A1* | 10/2011 | Russell .......................... 398/25 |
| 2012/0131144 A1* | 5/2012 | Cooper ................. G06F 9/5055 |
| | | 709/219 |
| 2013/0025437 A1* | 1/2013 | Serletic et al. ................. 84/634 |
| 2013/0201829 A1* | 8/2013 | Pacella ........................ 370/235 |
| 2013/0337789 A1* | 12/2013 | Johnson .................... 455/414.1 |
| 2014/0201415 A1* | 7/2014 | Huang et al. ................ 710/303 |
| 2014/0223019 A1* | 8/2014 | McCann et al. ............. 709/228 |
| 2014/0226639 A1 | 8/2014 | Yi et al. |
| 2014/0280703 A1* | 9/2014 | Vaks et al. .................... 709/217 |

* cited by examiner

SERVICE ACQUISITION TECHNIQUES FOR WIRELESS COMMUNICATIONS SYSTEMS

RELATED CASE

This application claims priority to U.S. Provisional Patent Application No. 61/818,827, filed May 2, 2013, the entirety of which is hereby incorporated by reference.

BACKGROUND

In some wireless communications systems, devices therein may offer services for consumption by other devices. In some cases, an application on a particular device therein may select multiple services for acquisition from other devices in the system. The application may then generate a request to acquire the multiple services from the devices by which they are offered. According to conventional techniques, in processing such a request, the device may attempt to acquire the multiple services one at a time. Additionally, if an attempt to acquire one of the multiple services fails, the device may proceed with attempts to acquire the remaining services.

DETAILED DESCRIPTION

Various embodiments may be generally directed to improved service acquisition techniques for wireless communications systems. In one embodiment, for example, an apparatus may comprise a processor circuit, a service acquisition application for execution by the processor circuit to select multiple services for attempted acquisition, and a service management module for execution by the processor circuit to attempt to acquire the multiple services according to a connection mode, the service management module to attempt to acquire the multiple services concurrently when the connection mode comprises a concurrent connection mode. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
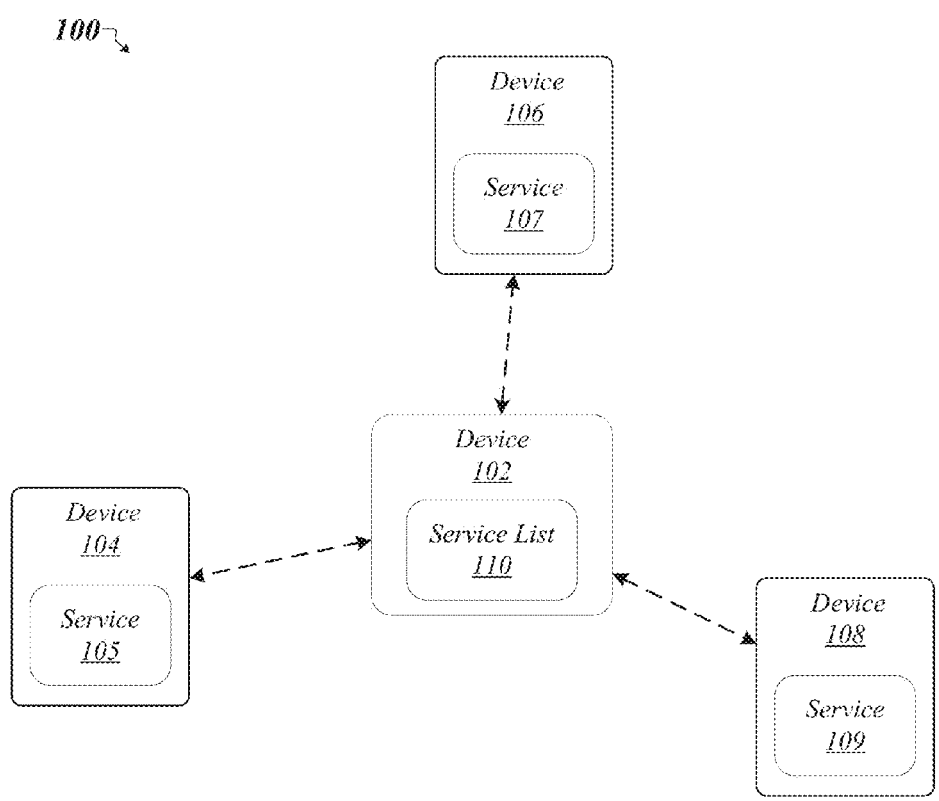
FIG. 1 illustrates one embodiment of a first operating environment.

FIG. 1 illustrates an operating environment 100 according to various embodiments. As shown in FIG. 1, a device 102 may wirelessly communicate with one or more of devices 104, 106, and 108. In some embodiments, operating environment 100 may comprise a wireless network implementing one or more Wi-Fi Alliance (WFA) standards. In various embodiments, for example, operating environment 100 may comprise a wireless network operating according to the WFA Wi-Fi Direct specification released Oct. 25, 2010, or any predecessor or successor thereof. In some such embodiments, device 102 may be operative to wirelessly communicate with one or more of device 104, 106, and 108 via Wi-Fi Direct connections. The embodiments are not limited in this context.

In various embodiments, device 102 may be operative to wirelessly communicate with one or more of device 104, 106, and 108 to obtain one or more services offered by those devices. For example, device 102 may wirelessly communicate with device 104 to obtain service 105, may wirelessly communicate with device 106 to obtain service 107, and/or may wirelessly communicate with device 108 to obtain service 109. In some embodiments, obtaining services offered by devices 104, 106, and/or 108 may enable device 102 to make use of hardware and/or software capabilities of those devices. For example, if device 104 is a display, obtaining service 105 may enable device 102 to present information to a user on device 104. In another example, if service 107 is a gaming application, obtaining service 107 from device 106 may enable device 102 to run the gaming application. The embodiments are not limited to these examples. Further, it is to be understood that various embodiments may comprise greater and/or lesser numbers of devices and/or services than are illustrated in the example operating environment 100 of FIG. 1, and the embodiments are not limited in this context.

In some embodiments, operating environment 100 may comprise a Wi-Fi Direct network comprising devices operating using interfaces, protocols, and/or standards developed by the WFA Wi-Fi Direct Services (WFDS) Task Group. Hereinafter, such a Wi-Fi Direct network shall be referred to as a "WFDS network," and the term "WFDS embodiment" shall be employed to denote an embodiment comprising a WFDS network. Similarly, the term "WFDS service" shall be employed hereinafter to denote a service that is implemented, advertised, and/or otherwise made available based on one or more such interfaces, protocols, and/or standards developed by the WFDS Task Group. In various WFDS embodiments, one or more of services 105, 107, and 109 may comprise WFDS services. The embodiments are not limited in this context.

In some embodiments, device 102 may attempt to obtain none, one, or more than one of services 105, 107, and 109. In various embodiments, if acquisition attempts are to be performed for one or more of services 105, 107, and 109, device 102 may be operative to generate a service list 110 identifying the one or more services for which the acquisition attempts are to be made. In some WFDS embodiments, service list 110 may be comprised within a "ConnectSessions" application programming interface (API) instruction. Hereinafter, the term "service group" shall be employed to denote a set of multiple services identified by a single service list, such as service list 110. For example, if service list 110 identifies services 105, 107, and 109, then services 105, 107, and 109 may be said to comprise a service group. The embodiments are not limited in this context.

Figure 2:
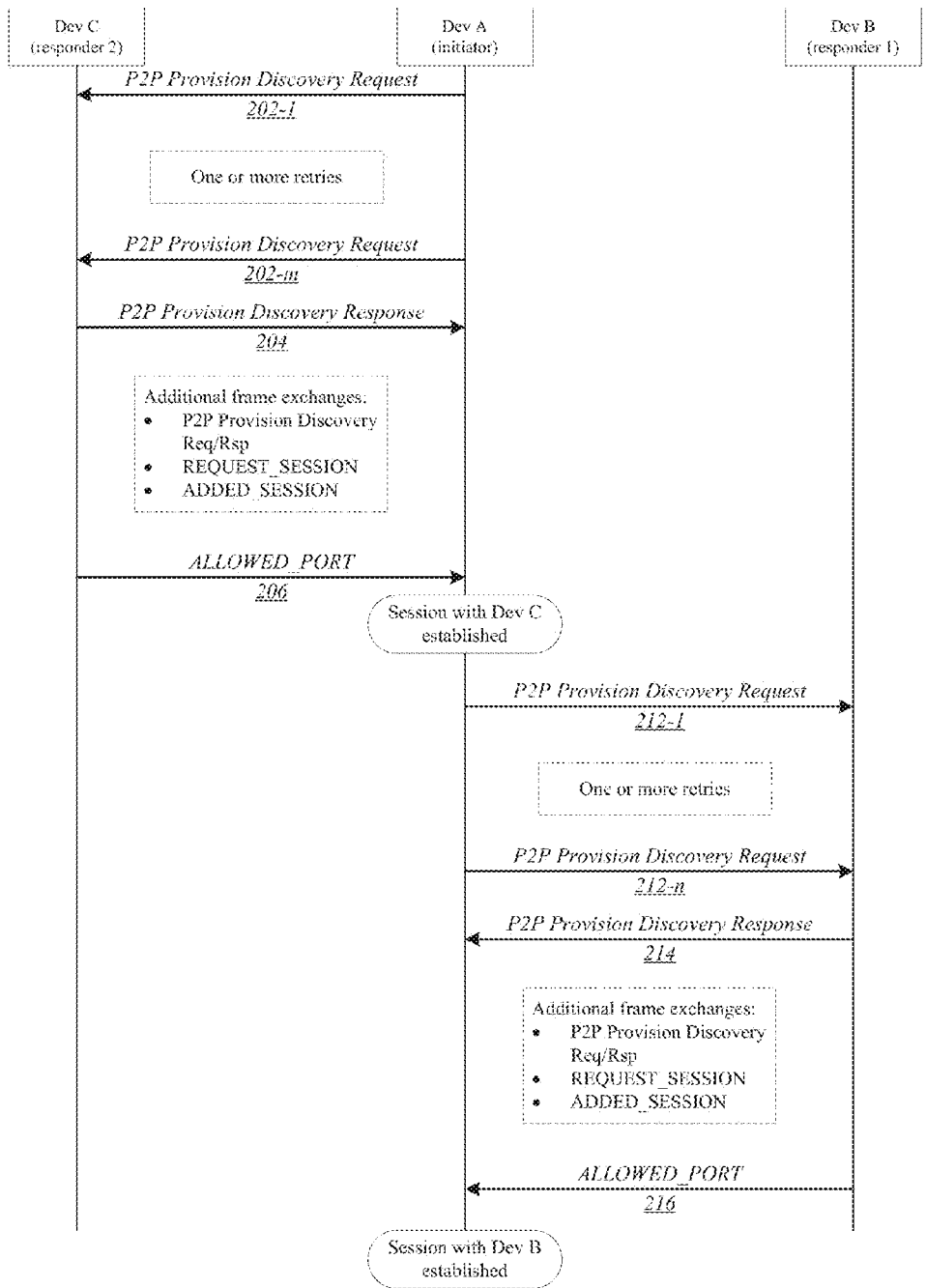
FIG. 2 illustrates one embodiment of a first communications flow.

In conventional systems, a "stop-and-go" approach is used to attempt to obtain the services in a service group. According to such an approach, a system attempts to obtain the services in the service group one at a time. FIG. 2 illustrates an example of a communications flow 200 corresponding to such an approach in a WFDS network. As shown in FIG. 2, a device A may communicate with a device B and a device C. Device A may comprise an initiator and devices B and C may comprise responders. First, device A may transmit one or more P2P provision discovery requests 202-m to device C. Device C may respond by transmitting a P2P provision discovery response 204 to device A. Devices A and C may then exchange additional frames and/or messages, which may include P2P provision discovery request and response frames, REQUEST_SESSION frames, and ADDED_SESSION frames. Then, device C may transmit an ALLOWED_PORT frame 206 to device A, and a session with device C may be established. It is only at this point that device A may commence the process of exchanging communications including P2P provision discovery requests 212-n, P2P provision discovery response 214, and ALLOWED_PORT frame 216 with device B to establish a session with device B. One drawback of conventional systems such as that illustrated by example communications flow 200 may be that the use of a stop-and-go approach can limit performance and increase the latency associated with service acquisition.

In some embodiments, the services in a service group may be unrelated to each other, and may be identified in the same service list simply because they have been discovered and selected for acquisition in close temporal proximity, or for other reasons. However, in various other embodiments, the services in a service group may offer functionality that is interrelated in such a fashion that it is desirable or necessary that some or all of them be obtained in combination. Hereinafter, the "correlated service group" shall be employed to denote a service group in which two or more of the services are interrelated in such fashion that it may be desirable or necessary to obtain some or all of them in combination. In some embodiments, as will be discussed below, a service list that identifies a service group may also comprise or be accompanied by one or more parameters that indicate whether that service group is a correlated service group. The embodiments are not limited in this context.

Figure 3:
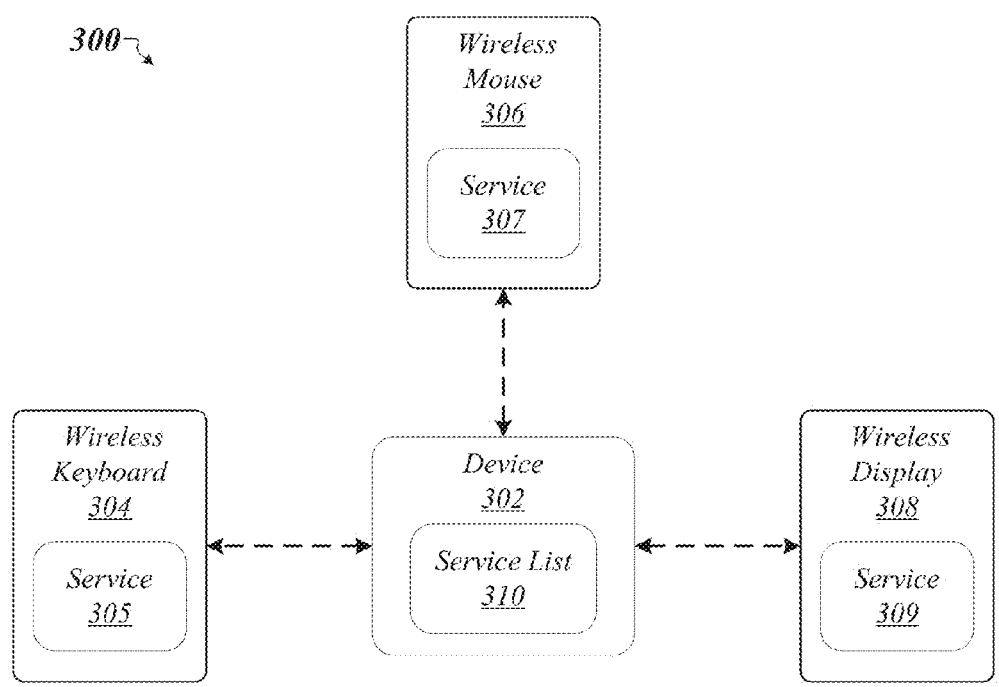
FIG. 3 illustrates one embodiment of a second operating environment.

FIG. 3 illustrates an operating environment 300 comprising an example of an embodiment in which a device may generate a service list identifying a correlated service group. More particularly, operating environment 300 may comprise an example of an environment such as a wireless docking station, in which assorted peripherals are made available for wireless use by a device such as a computer. As shown in FIG. 3, operating environment 300 comprises device 302, wireless keyboard 304, wireless mouse 306, and wireless display 308. Each of these three peripheral devices offers a respective service that, if obtained by device 302, enables device 302 to utilize the functionality of the corresponding peripheral device. For example, wireless keyboard 304 offers a service 305, and obtaining service 305 may enable device 302 to accept inputs comprising keystrokes performed on wireless keyboard 304 by a user.

In the example embodiment of FIG. 3, the usefulness of operating environment 300 as a docking station may be derived from the use of the services therein in combination. For example, if device 302 is a smart phone, acquiring services 305, 307, and 309 in order to utilize wireless keyboard 304, wireless mouse 306, and wireless display 308 may enable a user to surf the web using an application residing on device 302 without having to hold device 302, and with an improved user experience provided by these peripherals. Under such circumstances, obtaining only some of services 305, 307, or 309 may not provide a similar improvement in the user experience. For example, if device 302 acquires wireless keyboard 304 and wireless display 308 but not wireless mouse 306, the user may still need to utilize touch screen of device 302 in order to navigate within a browser. In such a case, the user experience improvement associated with the use of wireless keyboard 304 and wireless display 308 may be offset by the need to continue holding device 302 in order to use it to navigate within the browser. As such, after discovering the services in operating environment 300, device 302 may be operative to generate a service list 310 identifying services 305, 307, and 309 as a correlated service group. The embodiments are not limited to this example.

When one of the services in a correlated service group cannot be obtained, it may be inefficient to attempt to obtain the remaining services in the correlated service group. For example, if service 307 in FIG. 3 cannot be obtained to enable use of wireless mouse 306, the purpose of the wireless docking station may be defeated and there may be little or no benefit associated with obtaining services 305 and 309 to enable use of wireless keyboard 304 and wireless display 308. Thus, for correlated service groups, an efficient approach may involve aborting pending service acquisition attempts for the entire group when any service within the correlated service group cannot be obtained. However, for service groups in which the services are not correlated, this approach may not be desirable. In service group in which the services are not interrelated, the unavailability of a particular service within the group may not have bearing on the utility of the other services in the group. Therefore, it may be desirable to provide a system that handles both correlated and uncorrelated service groups with the capability to differentiate between the two. One drawback of conventional systems may be that they lack such a capability.

Figure 4:
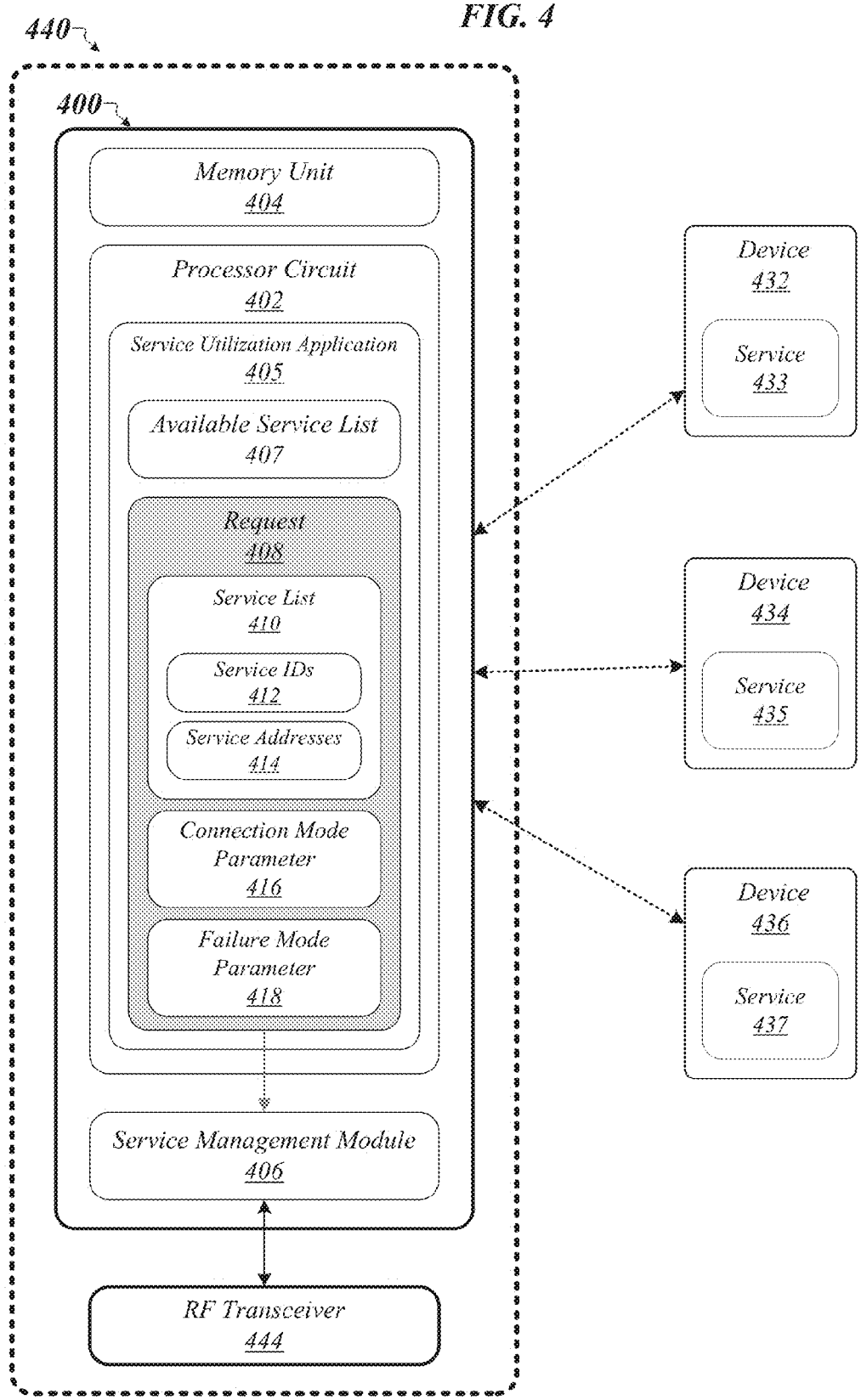
FIG. 4 illustrates one embodiment of an apparatus and one embodiment of a first system.

FIG. 4 illustrates a block diagram of an apparatus 400 that may be utilized to implement improved service acquisition techniques in a wireless communications system. As shown in FIG. 4, apparatus 400 comprises multiple elements including a processor circuit 402, a memory unit 404, and a service management module 406. The embodiments, however, are not limited to the type, number, or arrangement of elements shown in this figure.

In various embodiments, apparatus 400 may comprise processor circuit 402. Processor circuit 402 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 402 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 402 may be implemented as a general purpose processor, such as a processor made by Intel® Corporation, Santa Clara, Calif. The embodiments are not limited in this context.

In some embodiments, apparatus 400 may comprise or be arranged to communicatively couple with a memory unit 404. Memory unit 404 may be implemented using any machine-readable or computer-readable media capable of storing data, including both volatile and non-volatile memory. For example, memory unit 404 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 404 may be included on the same integrated circuit as processor circuit 402, or alternatively some portion or all of memory unit 404 may be disposed on an integrated circuit or other medium, for example a hard disk drive, that is external to the integrated circuit of processor circuit 402. Although memory unit 404 is comprised within apparatus 400 in FIG. 4, memory unit 404 may be external to apparatus 400 in some embodiments. The embodiments are not limited in this context.

In various embodiments, apparatus 400 may comprise a service management module 406. Service management module 406 may comprise logic, circuitry, and/or instructions operative to discover, monitor, acquire, maintain, utilize, offer, shut down, release, and/or otherwise manage one or more services offered by one or more external devices. In some embodiments, service management module 406 may be operative to generate, send, receive, parse, interpret, and/or process one or more messages according to a protocol defined for acquisition of such services and/or for communication with such external devices. For example, in various WFDS embodiments, service management module 406 may comprise one or more WFDS application programming interfaces (APIs). In some embodiments, service management module 406 may be comprised in service utilization application 405. In various embodiments, service management module 406 operate and/or be executed at a different device than service utilization application 405. The embodiments are not limited in this context.

FIG. 4 also illustrates a block diagram of a system 440. System 440 may comprise any of the aforementioned elements of apparatus 400. System 440 may further comprise a radio frequency (RF) transceiver 444. RF transceiver 444 may include one or more radios capable of transmitting and receiving signals using various suitable wireless communications techniques. Such techniques may involve communications across one or more wireless connections and/or networks. For example, apparatus 400 may utilize RF transceiver 444 to communicate with one or more external devices over one or more Wi-Fi Direct connections. Other exemplary communications include (but are not limited to) communications over wireless local area networks (WLANs), wireless personal area networks (WPANs), wireless metropolitan area network (WMANs), cellular networks, and satellite networks. In communicating across such networks, RF transceiver 444 may operate in accordance with one or more applicable standards and/or specifications in any version. The embodiments are not limited in this context.

In general operation, apparatus 400 and/or system 440 may be operative to obtain one or more services using improved service acquisition techniques. In various embodiments, the one or more services may be advertised by one or more external devices, such as the services 433, 435, and 437 advertised by external devices 432, 434, and 436 in the example embodiment in FIG. 4. The embodiments are not limited in this context.

In some embodiments, processor circuit 402 may be operative to execute a service utilization application 405. Service utilization application 405 may comprise any application capable of discovering, acquiring, and/or utilizing a service obtained from an external device. In various embodiments, service utilization application 405 may comprise a devoted application for discovering and reporting on nearby services. For example, in some embodiments, service utilization application 405 may comprise an application that presents a user with a list of all detected services and allows the user to select services from among that list for attempted acquisition. In various other embodiments, service utilization application 405 may comprise an application that simply possesses service discovery and/or utilization functionality. For example, in some embodiments, service utilization application 405 may comprise a gaming application that features the ability to discover and/or utilize advertised services corresponding to wireless peripherals such as joysticks, headphones, microphones, and/or controllers. The embodiments are not limited to these examples.

In various embodiments, the ability of service utilization application 405 to discover, acquire, and/or utilize services may depend in part on functionality provided by service management module 406. For example, in some embodiments, service utilization application 405 may not directly communicate with external devices, but rather may instruct service management module 406 to perform such communications on its behalf. In various embodiments, service management module 406 may be operative to perform such communications according to a protocol defined for acquisition of services advertised by external devices 432, 434, and 436. For example, in some WFDS embodiments, service management module 406 may be operative to communicate with one or more of external devices 432, 434, and 436 according to one or more WFDS protocols and/or Wi-Fi Direct protocols. In various embodiments, service management module 406 may be operative to exchange such communications with one or more of external devices 432, 434, and 436 using RF transceiver 444. The embodiments are not limited in this context.

In some embodiments, service utilization application 405 and/or service management module 406 may be operative to detect one or more services offered by one or more external devices. For example, in FIG. 4, service utilization application 405 and/or service management module 406 may be operative to detect services 433, 435, and 437. In various embodiments, service utilization application 405 and/or service management module 406 may detect offered services based on advertisement messages received from the devices offering those services. In some other embodiments, service utilization application 405 and/or service management module 406 may be operative to prompt nearby devices for information regarding any services that they offer, and may detect the offered services based on received responses. In various embodiments, service utilization application 405 and/or service management module 406 may be operative to generate an available service list 407 comprising a list of detected services. The embodiments are not limited in this context.

In some embodiments, service utilization application 405 may be operative to determine whether to attempt to acquire any detected services. In various embodiments, for example, service utilization application 405 may be operative to analyze available service list 407 and to determine whether to attempt to obtain any of the services comprised in available service list 407. In some embodiments, service utilization application 405 may determine that no attempts should be performed to acquire any detected services. In various other embodiments, however, service utilization application 405 may be operative to determine that attempts should be performed to obtain one or more detected services. In some embodiments, for example, service utilization application 405 may be operative to determine that attempts should be performed to obtain one or more services among those comprised in available service list 407. The embodiments are not limited in this context.

In various embodiments, service utilization application 405 may be operative to determine one or more services for attempted acquisition based on user input. For example, in some embodiments, service utilization application 405 may be operative on a touchscreen display to present available service list 407, and the touchscreen display may be operative to accept user input comprising a selection for attempted acquisition of one or more services comprised in available service list 407. In various embodiments, service utilization application 405 may alternatively or additionally be operative to automatically determine one or more services for attempted acquisition. In an example of such an embodiment, service utilization application 405 may be operative to automatically select for attempted acquisition any detected services corresponding to wireless input devices. The embodiments are not limited in this context.

In some embodiments, when it determines that acquisition attempts should be performed for one or more services, service utilization application 405 may be operative to generate a request 408 for forwarding to service management module 406. In various WFDS embodiments, the request 408 may comprise a ConnectSessions API instruction. In some embodiments, the request 408 may comprise a service list 410 identifying each of the one or more services for which acquisition attempts are to be performed. In various WFDS embodiments, service list 410 may comprise a field, parameter, or set of parameters within a ConnectSessions API instruction. In some embodiments, service list 410 may comprise service identifications (IDs) 412. In various embodiments, each service ID may comprise a name of a desired service. In some embodiments WFDS embodiments, each service ID 412 may comprise an advertisement ID of a WFDS service. In various embodiments, service list 410 may comprise service addresses 414. In some embodiments, each service address 414 may comprise a media access control (MAC) address of a device offering a service identified by one of service IDs 412. In various WFDS embodiments, each service address 414 may comprise a MAC address of a device offering a WFDS service identified by an advertisement ID among service IDs 412. The embodiments are not limited in this context.

In some embodiments, request 408 may comprise connection mode parameter 416. In various embodiments, connection mode parameter 416 may comprise a value indicating whether attempts to obtain the services identified in services list 410 are to be performed serially or concurrently. In some embodiments, one value for connection mode parameter 416 may indicate a concurrent connection mode in which acquisition attempts are to be performed concurrently, and another value for connection mode parameter 416 may indicate a serial connection mode in which acquisition attempts are to be performed serially. In various WFDS embodiments, connection mode parameter 416 may comprise a "session_establishment_mode" parameter within a ConnectSessions API instruction. In some embodiments, when service list 410 comprises only one service, connection mode parameter 416 may be omitted from request 408. In various other embodiments, when service list 410 comprises only one service, connection mode parameter 416 may comprise a placeholder value, dummy value, null value, or other value, which may be ignored during subsequent processing. The embodiments are not limited in this context.

In some embodiments, request 408 may comprise failure mode parameter 418. In various embodiments, failure mode parameter 418 may comprise a value indicating whether other acquisition attempts are to be aborted when an attempt to acquire a particular service in service list 410 fails. In some embodiments, one value for failure mode parameter 418 may indicate a "stop" failure mode, and another value for failure mode parameter 418 may indicate a "continue" failure mode. In various embodiments, in a stop mode, if an attempt to obtain any service in service list 410 fails, then all attempts to obtain the remaining services in service list 410 may be canceled. In some embodiments, in a continue mode, if an attempt to obtain any service in service list 410 fails, the attempts to obtain the remaining services in service list 410 may still be performed. In various WFDS embodiments, failure mode parameter 418 may comprise a "failure_mode" parameter within a ConnectSessions API instruction. In some embodiments, when service list 410 comprises only one service, failure mode parameter 418 may be omitted from request 408. In various other embodiments, when service list 410 comprises only one service, failure mode parameter 418 may comprise a placeholder value, dummy value, null value, or other value, which may be ignored during subsequent processing. The embodiments are not limited in this context.

In some embodiments, when service list 410 comprises multiple services, one or both of connection mode parameter 416 and failure mode parameter 418 may be utilized to indicate whether those multiple services comprise a correlated service group. For example, in various embodiments, a convention may be employed according to which when multiple services identified in service list 410 comprise a correlated service group, connection mode parameter 416 may specify the concurrent connection mode, and/or failure mode parameter 418 may specify the stop failure mode. In some other embodiments, request 408 may comprise a separate parameter indicating whether the multiple services comprise a correlated service group. The embodiments are not limited in this context.

In various embodiments, service management module 406 may receive request 408 from service utilization application 405. In some embodiments, request 408 may comprise a request to obtain multiple services, and service list 410 may identify those multiple services. In various WFDS embodiments, request 408 may comprise a ConnectSessions API instruction including advertisement IDs and MAC addresses for each of the multiple services. The embodiments are not limited in this context.

In some embodiments, service management module 406 may be operative to determine a connection mode for the request 408. In various embodiments, the connection mode may comprise a concurrent connection mode, according to which attempts to obtain the multiple services may be performed concurrently. In some other embodiments, the connection mode may comprise a serial connection mode, according to which attempts to obtain the multiple services may be performed one at a time. In various embodiments, request 408 may comprise connection mode parameter 416, and service management module 406 may be operative to determine the connection mode for request 408 based on connection mode parameter 416. In some embodiments, service utilization application 405 may be operative to employ one or more algorithms to determine whether the multiple services identified in service list 410 comprise a correlated service group and may select the connection mode accordingly. In various such embodiments, if service utilization application 405 determines that the multiple services comprise a correlated service group, it may be operative to select the concurrent connection mode, and otherwise may be operative to select the serial connection mode. Service utilization application 405 may then be operative to include in request 408 a value for connection mode parameter 416 indicating the selected connection mode.

In some other embodiments, connection mode parameter 416 may not be comprised within request 408, but rather may comprise a parameter provisioned within service management module 406 or elsewhere within apparatus 400. In various such embodiments, connection mode parameter 416 may comprise a universal parameter, such that all service acquisition attempts handled by service management module 406 are performed using a same connection mode. In yet other embodiments, service management module 406 may be operative to select the connection mode itself, rather than determining it based on a connection mode parameter. In some such embodiments, service management module 406 may be operative to select the connection mode based on whether the multiple services comprise a correlated service group. The embodiments are not limited in this context.

In various embodiments, service management module 406 may be operative to determine whether attempts to obtain the multiple services are to be performed concurrently or serially, based on the connection mode. In some embodiments, if it determines a concurrent connection mode, service management module 406 may be operative to perform concurrent attempts to obtain the multiple services. In various WFDS embodiments, if it determines a concurrent connection mode, service management module 406 may be operative use a separate instantiation of the state machine for each of the concurrent attempts. In some embodiments, if it determines a serial connection mode, service management module 406 may be operative to attempt to obtain the two or more services one at a time. The embodiments are not limited in this context.

In various embodiments, service management module 406 may be operative to determine a failure mode for the request 408. In some embodiments, the failure mode may comprise a "stop" mode. In the stop mode, when an attempt to obtain one of the multiple services fails, attempts to obtain the remaining services may be aborted. In various other embodiments, the failure mode may comprise a "continue" mode. In the continue mode, when an attempt to obtain one of the multiple services fails, attempts to obtain the remaining services may be maintained. In some embodiments, request 408 may comprise failure mode parameter 418, and service management module 406 may be operative to determine the failure mode for request 408 based on failure mode parameter 418. In various embodiments, service utilization application 405 may be operative to employ one or more algorithms to determine whether the multiple services identified in service list 410 comprise a correlated service group and may select the failure mode accordingly. In some such embodiments, if service utilization application 405 determines that the multiple services comprise a correlated service group, it may be operative to select the stop mode as the failure mode, and otherwise may be operative to select the continue mode as the failure mode. Service utilization application 405 may then be operative to include in request 408 a value for failure mode parameter 418 indicating the selected failure mode.

In various other embodiments, failure mode parameter 418 may not be comprised within request 408, but rather may comprise a parameter provisioned within service management module 406 or elsewhere within apparatus 400. In some such embodiments, failure mode parameter 418 may comprise a universal parameter, such that all service acquisition attempts handled by service management module 406 are performed using a same failure mode. In yet other embodiments, service management module 406 may select the failure mode itself, rather than determining it based on a failure mode parameter. In various such embodiments, service management module 406 may be operative to select the failure mode based on whether the multiple services comprise a correlated service group. The embodiments are not limited in this context.

In some embodiments, if an attempt to obtain one of the multiple services fails during service acquisition in either concurrent or serial connection mode, service management module 406 may be operative to determine whether to abort attempts to obtain any other services among the multiple services based on the failure mode. In various embodiments, service management module 406 may be operative to abort attempts to obtain any other services among the multiple services when one of the multiple services fails and the failure mode comprises a stop mode. In some embodiments, service management module 406 may be operative to maintain the attempts to obtain any other services among the multiple services when one of the multiple services fails and the failure mode comprises a continue mode. The embodiments are not limited in this context.

It is worthy of note that in some cases, it may be desirable to employ different failure modes for different services identified in service list 410. In an example embodiment, the operating environment 300 of FIG. 3 may additionally comprise wireless speakers. Although it may be desirable to attempt to acquire those wireless speakers, the usefulness of operating environment 300 as a wireless docking station may not be significantly reduced if the wireless speakers cannot be utilized. As such, a continue mode may be appropriate with respect to failure to obtain the wireless speakers, even while a stop mode is appropriate with respect to failures to obtain the wireless keyboard 304, wireless mouse 306, and/or wireless display 308. In various embodiments, in order to enable failures to acquire different respective services in a same service list 410 to be handled differently, request 408 may comprise parameters and/or other information specifying failure modes for the services identified in service list 410 on an individual basis. For example, in some embodiments, request 408 may comprise a list of services for which a stop mode is to be utilized and a list of services for which continue mode is to be utilized. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
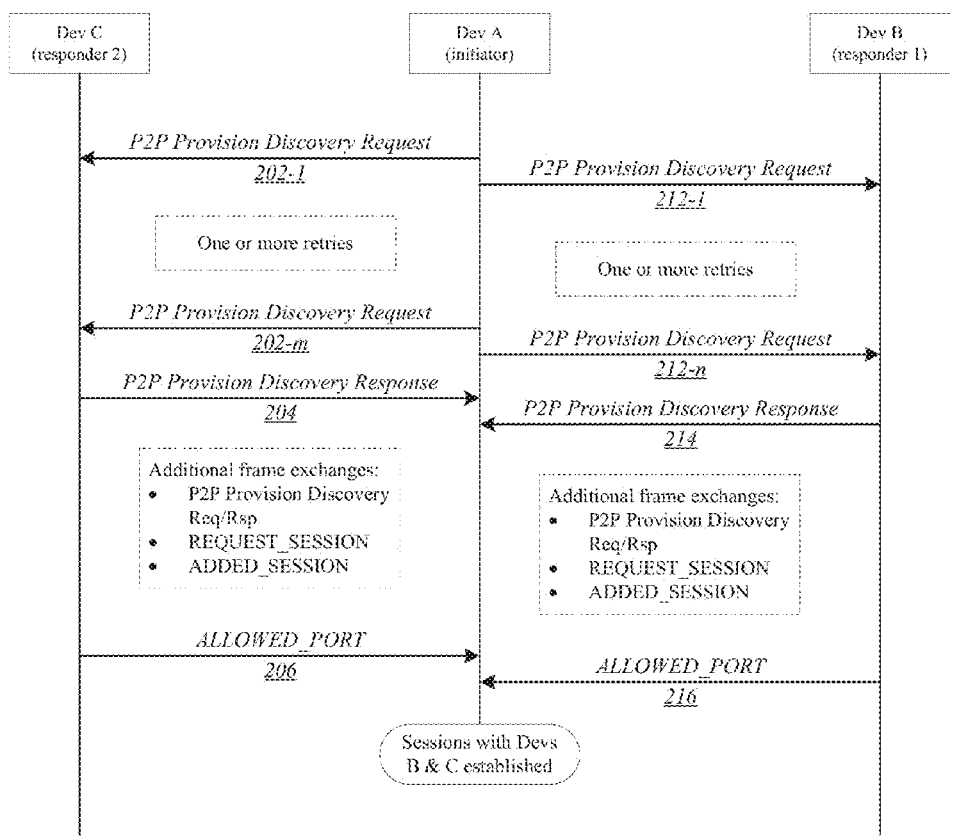
FIG. 5 illustrates one embodiment of a second communications flow.

FIG. 5 illustrates an example of a communications flow 500 associated with the utilization of improved service acquisition techniques in various embodiments. More particularly, communications flow 500 illustrates communications that may be performed in a WFDS network in which acquisition attempts are performed for multiple services in a concurrent connection mode. Communications flow 500 depicts the same communications between the same devices as those illustrated in communications flow 200 of FIG. 2. However, in communications flow 500, device A does not wait for the session with device C to be established before it begins establishing the session with device B. As such, while device A in communications flow 200 of FIG. 2 does not transmit P2P provision discovery request 212-1 until after it receives ALLOWED_PORT frame 206, device A transmits P2P provision discovery request 212-1 shortly after transmitting P2P provision discovery request 202-1 in communications flow 500. In some WFDS embodiments, a device such as device A may use separate state machine instantiations in conjunction with performing the communications in communications flow 500. The embodiments are not limited in this context.

Figure 6:
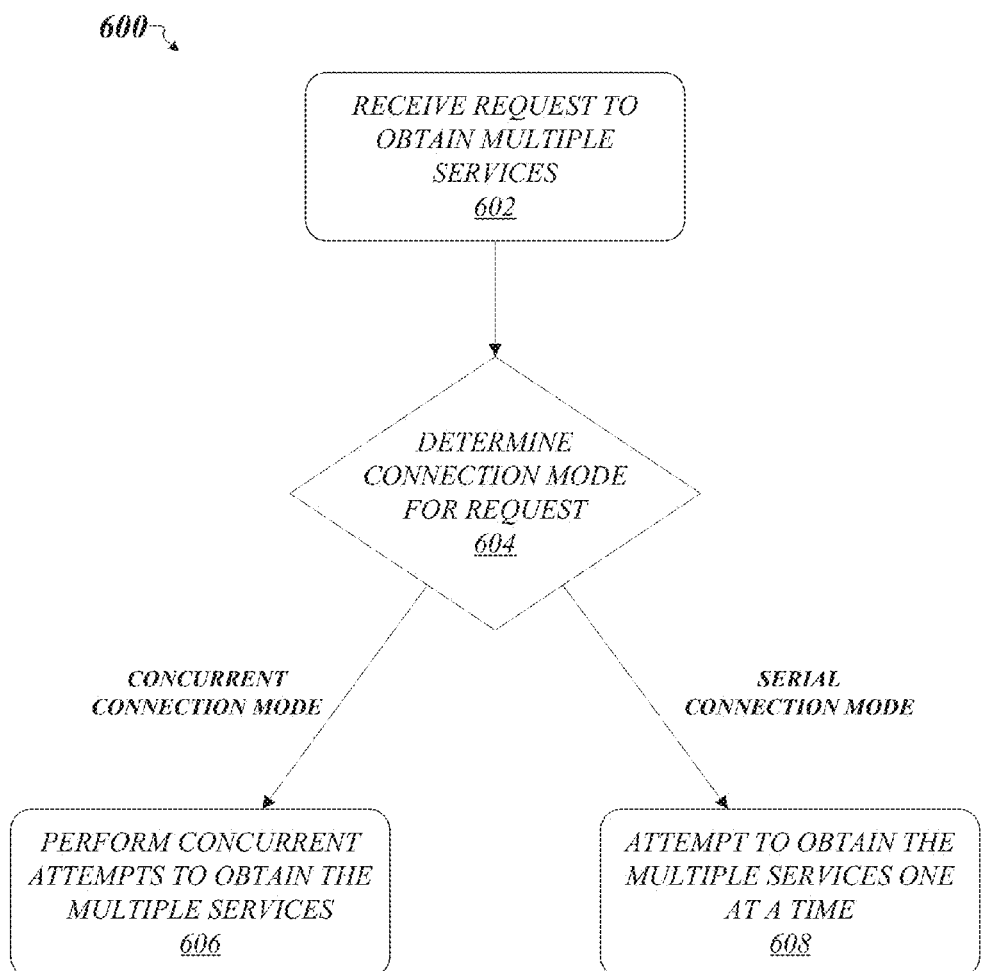
FIG. 6 illustrates one embodiment of a logic flow.

FIG. 6 illustrates one embodiment of a logic flow 600, which may be representative of the operations executed by one or more embodiments described herein. As shown in logic flow 600, at 602, a request to obtain multiple services may be received. For example, service management module 406 of FIG. 4 may receive a request 408 from service utilization application 405, and the request 408 may comprise a service list 410 identifying multiple services to be obtained. At 604, a connection mode may be determined for the request. For example, service management module 406 of FIG. 4 may be operative to determine a connection mode for the request 408 based on a connection mode parameter 416 comprised in the request 408. If it is determined at 604 that the connection mode is a concurrent connection mode, flow may pass to 606. At 606, concurrent attempts to obtain the multiple services may be performed. For example, service management module 406 of FIG. 4 may be operative to perform concurrent attempts to obtain multiple services identified by service list 410 in request 408. If it is determined at 604 that the connection mode is a serial connection mode, flow may pass to 608. At 608, attempts to obtain the multiple services may be performed one at a time. For example, service management module 406 of FIG. 4 may be operative to attempt to obtain multiple services identified by service list 410 in request 408 one at a time. The embodiments are not limited to these examples.

Figure 7:
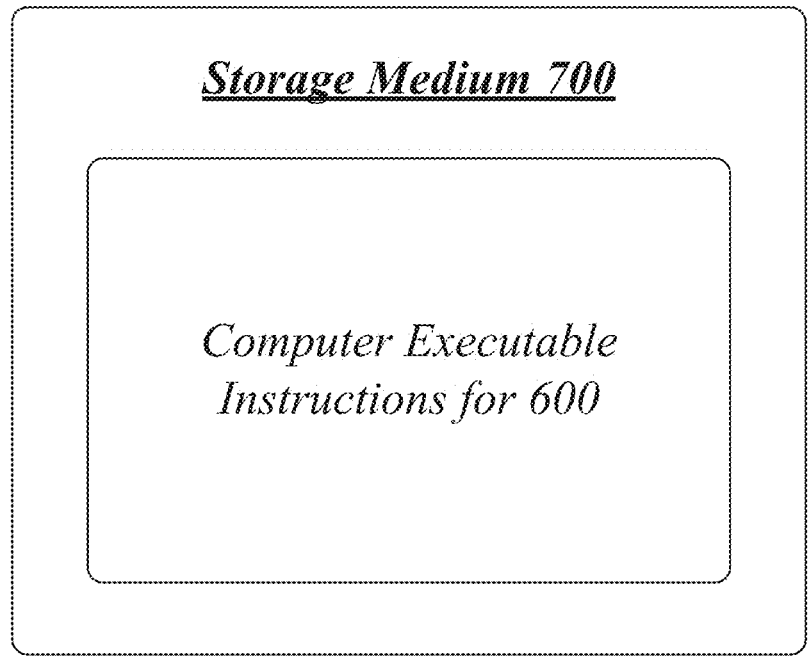
FIG. 7 illustrates one embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
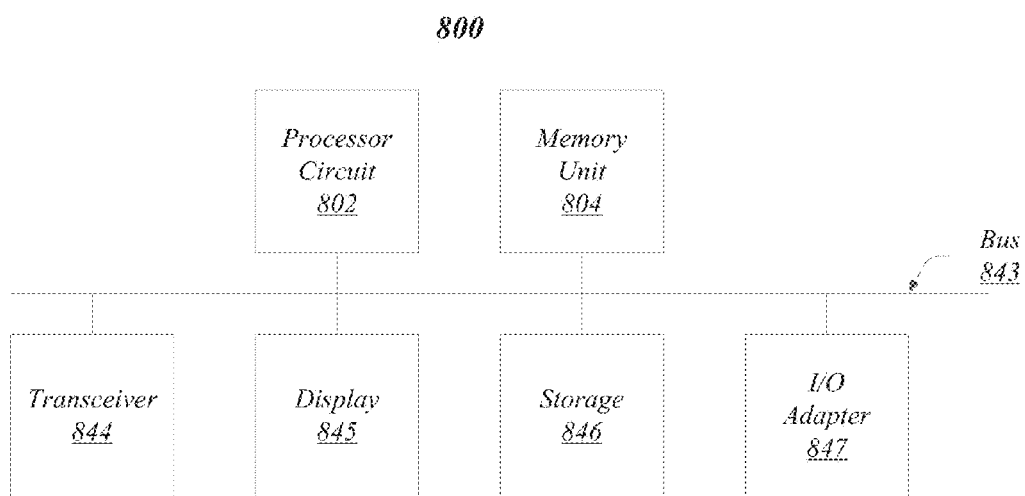
FIG. 8 illustrates one embodiment of a second system.

FIG. 8 illustrates one embodiment of a system 800. In various embodiments, system 800 may be representative of a system or architecture suitable for use with one or more embodiments described herein, such as apparatus 400 and/or system 440 of FIG. 4, logic flow 600 of FIG. 6, and/or storage medium 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor circuit 802. Processor circuit 802 may be implemented using any processor or logic device, and may be the same as or similar to processor circuit 402 of FIG. 4.

In one embodiment, system 800 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory, and may be the same as or similar to memory unit 404 of FIG. 4. In some embodiments, the machine-readable or computer-readable medium may include a non-transitory medium. The embodiments are not limited in this context.

In various embodiments, system 800 may include an RF transceiver 844. RF transceiver 844 may include one or more radios capable of transmitting and receiving signals using various suitable wireless communications techniques, and may be the same as or similar to RF transceiver 444 of FIG. 4.

In various embodiments, system 800 may include a display 845. Display 845 may comprise any display device capable of displaying information received from processor circuit 802. Examples for display 845 may include a television, a monitor, a projector, and a computer screen. In one embodiment, for example, display 845 may be implemented by a liquid crystal display (LCD), light emitting diode (LED) or other type of suitable visual interface. Display 845 may comprise, for example, a touch-sensitive display screen ("touchscreen"). In various implementations, display 845 may comprise one or more thin-film transistors (TFT) LCD including embedded transistors. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

Figure 9:
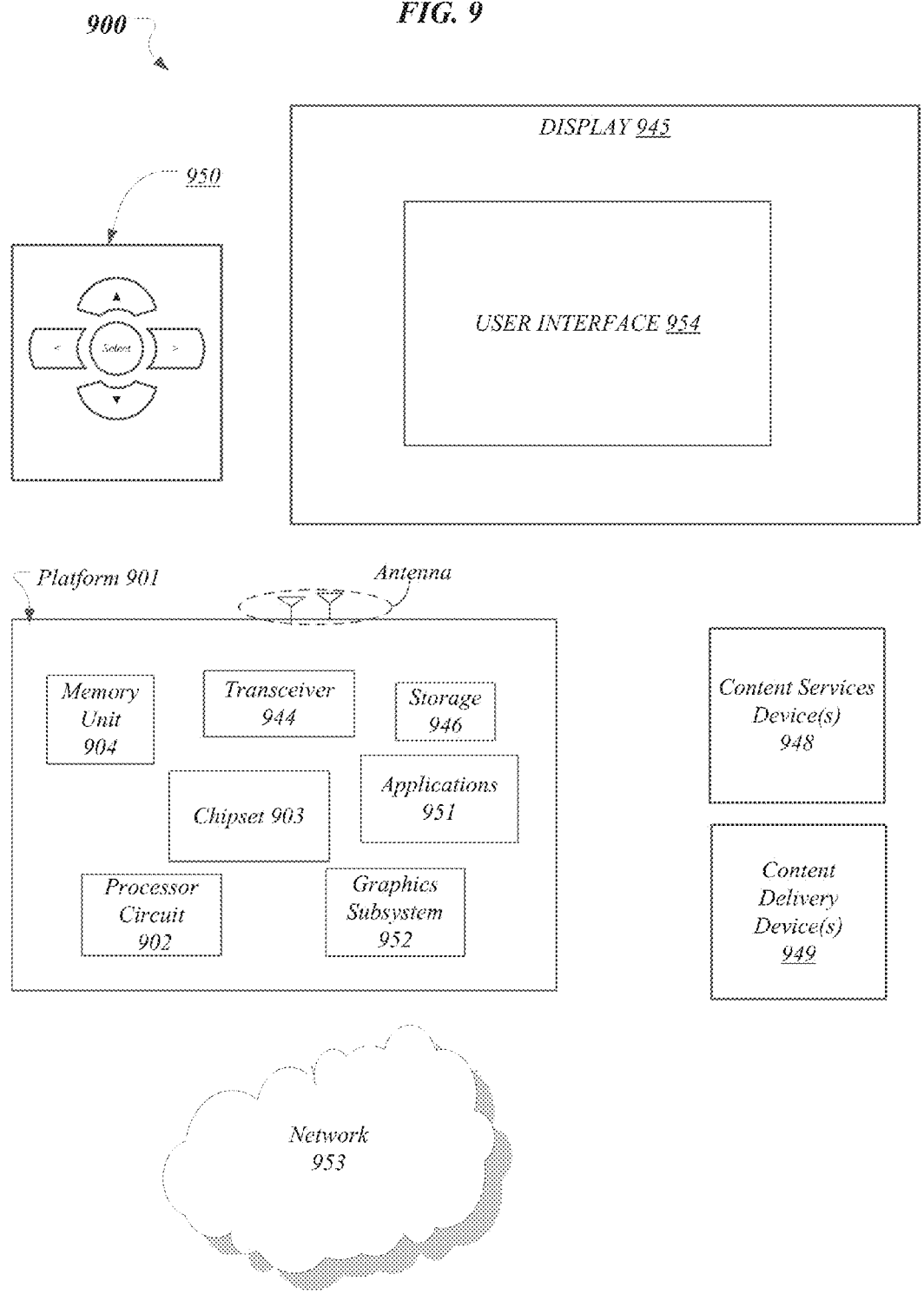
FIG. 9 illustrates one embodiment of a third system.

FIG. 9 illustrates an embodiment of a system 900. In various embodiments, system 900 may be representative of a system or architecture suitable for use with one or more embodiments described herein, such as apparatus 400 and/or system 440 of FIG. 4, logic flow 600 of FIG. 6, storage medium 700 of FIG. 7, and/or system 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor circuit 902, chipset 903, memory unit 904, transceiver 944, storage 946, applications 951, and/or graphics subsystem 952. Chipset 903 may provide intercommunication among processor circuit 902, memory unit 904, transceiver 944, storage 946, applications 951, and/or graphics subsystem 952. For example, chipset 903 may include a storage adapter (not depicted) capable of providing intercommunication with storage 946.

Processor circuit 902 may be implemented using any processor or logic device, and may be the same as or similar to processor circuit 802 in FIG. 8.

Memory unit 904 may be implemented using any machine-readable or computer-readable media capable of storing data, and may be the same as or similar to memory unit 804 in FIG. 8.

Transceiver 944 may include one or more radios capable of transmitting and receiving signals using various suitable wireless communications techniques, and may be the same as or similar to transceiver 844 in FIG. 8.

Display 945 may include any television type monitor or display, and may be the same as or similar to display 845 in FIG. 8.

Storage 946 may be implemented as a non-volatile storage device, and may be the same as or similar to storage 846 in FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor circuit 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the disclosed subject matter.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
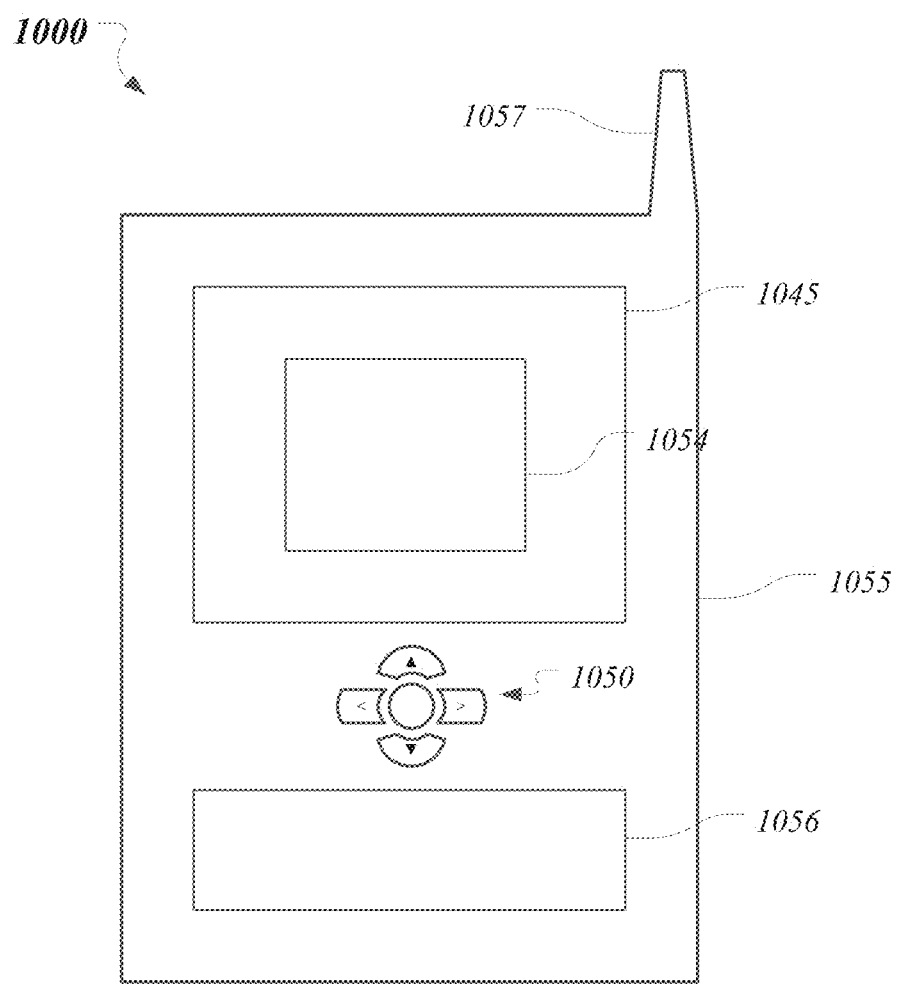
FIG. 10 illustrates one embodiment of a device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is at least one machine-readable medium comprising a set of service acquisition instructions that, in response to being executed on a computing device, cause the computing device to: receive a request to obtain multiple services; determine a connection mode for the request; and when the connection mode comprises a concurrent connection mode, perform concurrent attempts to obtain the multiple services.

In Example 2, the at least one machine-readable medium of Example 1 may optionally comprise instructions that, in response to being executed on the computing device, cause the computing device to, when the connection mode comprises a serial connection mode, attempt to obtain the multiple services one at a time.

In Example 3, the at least one machine-readable medium of any one of Examples 1 to 2 may optionally comprise instructions that, in response to being executed on the computing device, cause the computing device to determine the connection mode based on a connection mode parameter.

In Example 4, the connection mode parameter of Example 3 may optionally be comprised in the request.

In Example 5, the at least one machine-readable medium of any one of Examples 1 to 4 may optionally comprise instructions that, in response to being executed on the computing device, cause the computing device to: determine a failure mode for the request; and when an attempt to obtain one of the multiple services fails, determine whether to abort attempts to obtain any other services among the multiple services based on the failure mode.

In Example 6, the at least one machine-readable medium of Example 5 may optionally comprise instructions that, in response to being executed on the computing device, cause the computing device to: abort attempts to obtain any other services among the multiple services when an attempt to obtain one of the multiple services fails and the failure mode comprises a stop mode; and maintain the attempts to obtain any other services among the multiple services when an attempt to obtain one of the multiple services fails and the failure mode comprises a continue mode.

In Example 7, the at least one machine-readable medium of any one of Examples 5 to 6 may optionally comprise instructions that, in response to being executed on the computing device, cause the computing device to determine the failure mode based on a failure mode parameter.

In Example 8, the failure mode parameter of Example 7 may optionally be comprised in the request.

In Example 9, the request of any one of Examples 1 to 8 may optionally indicate an associated media access control (MAC) address for each of the multiple services.

In Example 10, the multiple services of any one of Examples 1 to 9 may optionally comprise Wi-Fi Direct Services (WFDS) services.

In Example 11, the request of any one of Examples 1 to 10 may optionally comprise a WFDS application programming interface (API) instruction.

In Example 12, the request of any one of Examples 1 to 11 may optionally indicate an advertisement identification (ID) for each of the multiple services.

Example 13 is a service acquisition apparatus, comprising: a processor circuit; a service acquisition application for execution by the processor circuit to select multiple services for attempted acquisition; and a service management module for execution by the processor circuit to attempt to acquire the multiple services according to a connection mode, the service management module to attempt to acquire the multiple services concurrently when the connection mode comprises a concurrent connection mode.

In Example 14, the service management module of Example 13 may optionally attempt to acquire the multiple services one at a time when the connection mode comprises a serial connection mode.

In Example 15, the service management module of any one of Examples 13 to 14 may optionally determine the connection mode based on a connection mode parameter received from the service acquisition application.

In Example 16, the service management module of any one of Examples 13 to 15 may optionally determine the connection mode by determining whether the multiple services comprise a correlated service group.

In Example 17, the service management module of any one of Examples 13 to 16 may optionally determine a failure mode for the attempted acquisition of the multiple services and when an attempt to acquire one of the multiple services fails, may optionally determine whether to abort attempts to acquire any other services among the multiple services based on the failure mode.

In Example 18, the service management module of Example 17 may optionally abort attempts to acquire any other services among the multiple services when an attempt to acquire one of the multiple services fails and the failure mode comprises a stop mode, and may optionally maintain the attempts to acquire any other services among the multiple services when an attempt to acquire one of the multiple services fails and the failure mode comprises a continue mode.

In Example 19, the service management module of any one of Examples 17 to 18 may optionally determine the failure mode based on a failure mode parameter received from the service acquisition application.

In Example 20, the service management module of any one of Examples 17 to 19 may optionally determine the failure mode by determining whether the multiple services comprise a correlated service group.

In Example 21, the multiple services of any one of Examples 13 to 20 may optionally comprise Wi-Fi Direct Services (WFDS) services.

In Example 22, the service management module of any one of Examples 13 to 21 may optionally attempt to acquire the multiple services based on a WFDS application programming interface (API) instruction generated by the service acquisition application.

In Example 23, the instruction of Example 22 may optionally indicate an advertisement identification (ID) for each of the multiple services.

In Example 24, the instruction of any one of Examples 22 to 23 may optionally indicate an associated media access control (MAC) address for each of the multiple services.

In Example 25, the service acquisition apparatus of any one of Examples 13 to 24 may optionally be coupled to a radio frequency (RF) transceiver to receive a service advertisement for at least one of the multiple services from a remote device.

In Example 26, the service acquisition apparatus of any one of Examples 13 to 24 may optionally be coupled to a memory unit to store an available service list and a touchscreen display to present the available service list and accept user input comprising a selection of one or more services comprised in the available service list.

Example 27 is a service acquisition method, comprising: receiving a request to obtain multiple services; determining a connection mode for the request; and when the connection mode comprises a concurrent connection mode, performing concurrent attempts to obtain the multiple services.

In Example 28, the service acquisition method of Example 27 may optionally comprise, when the connection mode comprises a serial connection mode, attempting to obtain the multiple services one at a time.

In Example 29, the service acquisition method of any one of Examples 27 to 28 may optionally comprise determining the connection mode based on a connection mode parameter.

In Example 30, the connection mode parameter of Example 29 may optionally be comprised in the request.

In Example 31, the service acquisition method of any one of Examples 27 to 30 may optionally comprise: determining a failure mode for the request; and when an attempt to obtain one of the multiple services fails, determining whether to abort attempts to obtain any other services among the multiple services based on the failure mode.

In Example 32, the service acquisition method of Example 31 may optionally comprise: aborting attempts to obtain any other services among the multiple services when an attempt to obtain one of the multiple services fails and the failure mode comprises a stop mode; and maintaining the attempts to obtain any other services among the multiple services when an attempt to obtain one of the multiple services fails and the failure mode comprises a continue mode.

In Example 33, the service acquisition method of any one of Examples 31 to 32 may optionally comprise determining the failure mode based on a failure mode parameter.

In Example 34, the failure mode parameter of Example 33 may optionally be comprised in the request.

In Example 35, the request of any one of Examples 27 to 34 may optionally indicate an associated media access control (MAC) address for each of the multiple services.

In Example 36, the multiple services of any one of Examples 27 to 35 may optionally comprise Wi-Fi Direct Services (WFDS) services.

In Example 37, the request of any one of Examples 27 to 36 may optionally comprise a WFDS application programming interface (API) instruction.

In Example 38, the request of any one of Examples 27 to 37 may optionally indicate an advertisement identification (ID) for each of the multiple services.

Example 39 is an apparatus, comprising means for performing a service acquisition method according to any one of Examples 27 to 38.

Example 40 is a service acquisition system, comprising: an apparatus according to Example 39; and a radio frequency (RF) transceiver to receive a service advertisement for at least one of the multiple services from a remote device.

Example 41 is a service acquisition system, comprising: an apparatus according to any one of Examples 39 to 40; a memory unit to store an available service list; and a touchscreen display to present the available service list and accept user input comprising a selection of one or more services comprised in the available service list.

Example 42 is a communications device arranged to perform a service acquisition method according to any one of Examples 27 to 38.

Example 43 is a service acquisition system, comprising: an apparatus according to any one of Examples 13 to 24; and a radio frequency (RF) transceiver to receive a service advertisement for at least one of the multiple services from a remote device.

Example 44 is a service acquisition system, comprising: an apparatus according to any one of Examples 13 to 24; a memory unit to store an available service list; and a touchscreen display to present the available service list and accept user input comprising a selection of one or more services comprised in the available service list.

Example 45 is a service acquisition apparatus, comprising: means for receiving a request to obtain multiple services; means for determining a connection mode for the request; and means for, when the connection mode comprises a concurrent connection mode, performing concurrent attempts to obtain the multiple services.

In Example 46, the service acquisition apparatus of Example 45 may optionally comprise means for, when the connection mode comprises a serial connection mode, attempting to obtain the multiple services one at a time.

In Example 47, the service acquisition apparatus of any one of Examples 45 to 46 may optionally comprise means for determining the connection mode based on a connection mode parameter.

In Example 48, the connection mode parameter of Example 47 may optionally be comprised in the request.

In Example 49, the service acquisition apparatus of any one of Examples 45 to 48 may optionally comprise: means for determining a failure mode for the request; and means for, when an attempt to obtain one of the multiple services fails, determining whether to abort attempts to obtain any other services among the multiple services based on the failure mode.

In Example 50, the service acquisition apparatus of Example 49 may optionally comprise: means for aborting attempts to obtain any other services among the multiple services when an attempt to obtain one of the multiple services fails and the failure mode comprises a stop mode; and means for maintaining the attempts to obtain any other services among the multiple services when an attempt to obtain one of the multiple services fails and the failure mode comprises a continue mode.

In Example 51, the service acquisition apparatus of any one of Examples 49 to 50 may optionally comprise means for determining the failure mode based on a failure mode parameter.

In Example 52, the failure mode parameter of Example 51 may optionally be comprised in the request.

In Example 53, the request any one of Examples 45 to 52 may optionally indicate an associated media access control (MAC) address for each of the multiple services.

In Example 54, the multiple services any one of Examples 45 to 52 may optionally comprise Wi-Fi Direct Services (WFDS) services.

In Example 55, the request any one of Examples 45 to 54 may optionally comprise a WFDS application programming interface (API) instruction.

In Example 56, the request any one of Examples 45 to 55 may optionally indicate an advertisement identification (ID) for each of the multiple services.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a set of instructions that, in response to being executed on a computing device, cause the computing device to:
   receive a request comprising a connection mode parameter to obtain multiple services provided by a plurality of devices, the connection mode parameter comprising a value to indicate whether attempts to obtain the multiple services are to be performed serially or concurrently;
   determine a connection mode to establish a session with each of the plurality of devices to obtain the multiple services based on the value of the connection mode parameter;
   when the value indicates the connection mode comprises a concurrent connection mode, perform concurrent attempts to obtain the multiple services by communicating concurrently with the plurality of devices to establish the sessions;
   when the value indicates the connection mode comprises a serial connection mode, attempt to obtain the multiple services one at a time;
   determine a failure mode for the request; and
   when an attempt to obtain one of the multiple services fails, determine whether to abort attempts to obtain any other services among the multiple services based on the failure mode.

2. The at least one non-transitory machine-readable medium of claim 1, comprising instructions that, in response to being executed on the computing device, cause the computing device to:
   abort attempts to obtain any other services among the multiple services when an attempt to obtain one of the multiple services fails and the failure mode comprises a stop mode; and
   maintain the attempts to obtain any other services among the multiple services when an attempt to obtain one of the multiple services fails and the failure mode comprises a continue mode.

3. The at least one non-transitory machine-readable medium of claim 1, comprising instructions that, in response to being executed on the computing device, cause the computing device to determine the failure mode based on a failure mode parameter.

4. The at least one non-transitory machine-readable medium of claim 3, the failure mode parameter comprised in the request.

5. The at least one non-transitory machine-readable medium of claim 1, the request indicating an associated media access control (MAC) address for each of the multiple services.

6. The at least one non-transitory machine-readable medium of claim 1, the multiple services comprising Wi-Fi Direct Services (WFDS) services.

7. The at least one non-transitory machine-readable medium of claim 6, the request comprising a WFDS application programming interface (API) instruction.

8. The at least one non-transitory machine-readable medium of claim 6, the request indicating an advertisement identification (ID) for each of the multiple services.

9. An apparatus, comprising:
   a processor circuit;
   a memory comprising instructions that, in response to being executed by the processor circuit cause the processing circuit to:
   receive a request comprising a connection mode parameter to obtain multiple services for attempted acquisition provided by a plurality of devices, the connection mode parameter comprising a value to indicate whether attempts to obtain the multiple services are to be performed serially or concurrently;
   attempt to acquire the multiple services from the plurality of devices based on the connection mode parameter;
   attempt to acquire the multiple services concurrently when the value indicates a concurrent connection mode by communicating with the plurality of devices concurrently;
   attempt to acquire the multiple services one at a time when the value indicates a serial connection mode;
   determine a failure mode for the attempted acquisition of the multiple services; and
   determine whether to abort attempts to acquire any other services among the multiple services based on the failure mode when an attempt to acquire one of the multiple services fails.

10. The apparatus of claim 9, processing circuit to determine whether to acquire the multiple services concurrently or serially based on whether the multiple services comprise a correlated service group.

11. The apparatus of claim 9, the processing circuit to abort attempts to acquire any other services among the multiple services when an attempt to acquire one of the multiple services fails and the failure mode comprises a stop mode, and maintain the attempts to acquire any other services among the multiple services when an attempt to acquire one of the multiple services fails and the failure mode comprises a continue mode.

12. The apparatus of claim 9, the processing circuit to determine the failure mode based on a failure mode parameter.

13. The apparatus of claim 9, the processing circuit to determine the failure mode by determining whether the multiple services comprise a correlated service group.

14. The apparatus of claim 9, the multiple services comprising Wi-Fi Direct Services (WFDS) services.

15. The apparatus of claim 14, the processing circuit to attempt to acquire the multiple services based on a WFDS application programming interface (API) instruction.

16. The apparatus of claim 15, the API instruction indicating an advertisement identification (ID) for each of the multiple services and an associated media access control (MAC) address for each of the multiple services.

17. The apparatus of claim 9, coupled to a radio frequency (RF) transceiver to receive a service advertisement for at least one of the multiple services from a remote device.

18. The apparatus of claim 9, coupled to a memory unit to store an available service list and a touchscreen display to present the available service list and accept user input comprising a selection of one or more services comprised in the available service list.

* * * * *